(12) United States Patent
Katsubo

(10) Patent No.: US 7,306,686 B2
(45) Date of Patent: Dec. 11, 2007

(54) METHOD FOR REUTILISING PLASTIC RECEPTACLES AND ARTICLE PRODUCED BY SAID METHOD

(76) Inventor: Fedor Fedorovich Katsubo, Skoriny Avenue, 76-21, Minski (BY) 220012

( * ) Notice: Subject to any disclaimer, the term of this patent is extended or adjusted under 35 U.S.C. 154(b) by 352 days.

(21) Appl. No.: 10/471,878

(22) PCT Filed: Mar. 14, 2002

(86) PCT No.: PCT/BY02/00001

§ 371 (c)(1),
(2), (4) Date: Mar. 15, 2004

(87) PCT Pub. No.: WO02/074511

PCT Pub. Date: Sep. 26, 2002

(65) Prior Publication Data

US 2004/0134605 A1    Jul. 15, 2004

(30) Foreign Application Priority Data

| Mar. 15, 2001 | (BY) | ................................. A 20010245 |
| Mar. 16, 2001 | (BY) | ................................. U 20010058 |
| Dec. 7, 2001 | (BY) | ................................. A 20011049 |
| Dec. 20, 2001 | (BY) | ................................. A 20011085 |

(51) Int. Cl.
*B29C 73/00* (2006.01)
*B32B 43/00* (2006.01)

(52) U.S. Cl. ......................... 156/94; 156/250; 264/919; 264/918; 264/230

(58) Field of Classification Search ............. 264/36.15, 264/36.16, 918, 919, 230; 156/304.1, 94, 156/250

See application file for complete search history.

(56) References Cited

U.S. PATENT DOCUMENTS

4,356,926 A * 11/1982 Priestly et al. .............. 220/611

FOREIGN PATENT DOCUMENTS

DE            282048 A    *   8/1990

* cited by examiner

*Primary Examiner*—Michael Miggins
(74) *Attorney, Agent, or Firm*—Sughrue Mion, PLLC

(57) ABSTRACT

The invention relates to recycling polymeric articles, in particular plastic receptacles and can be used for reutilizing plastic receptacles made of a heat-shrinkable material. The inventive method for reutilizing plastic receptacles consists in cutting said receptacles into hole-type elements in the form of small tubes and cylinders in order to use them afterwards as heat-shrinkable elements for coating and/or connecting construction elements by heat shrinkage while producing elongated articles which are used mainly as construction and/or advertising elements.

12 Claims, 3 Drawing Sheets

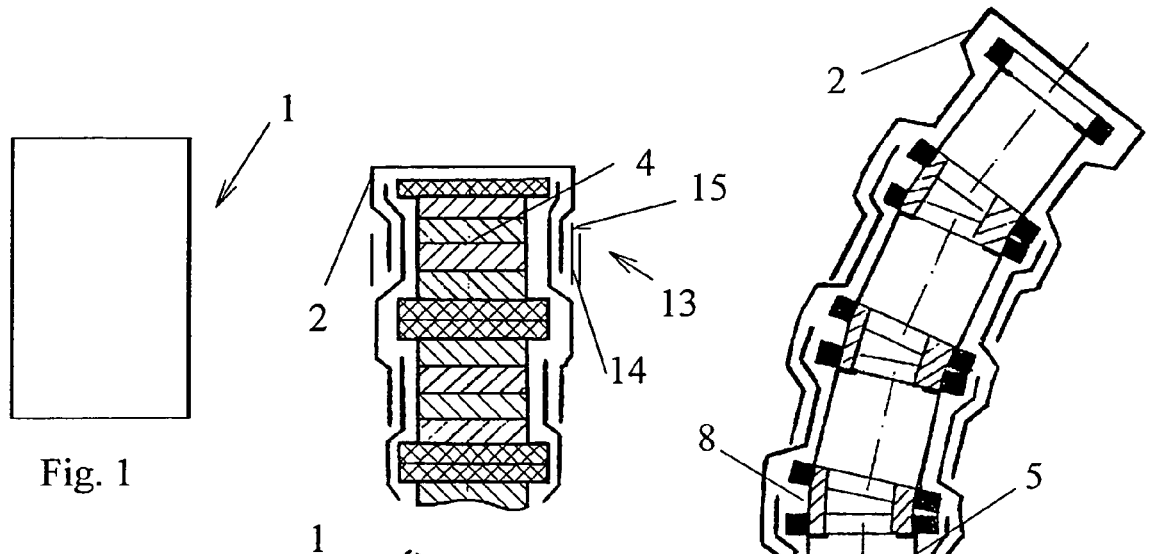
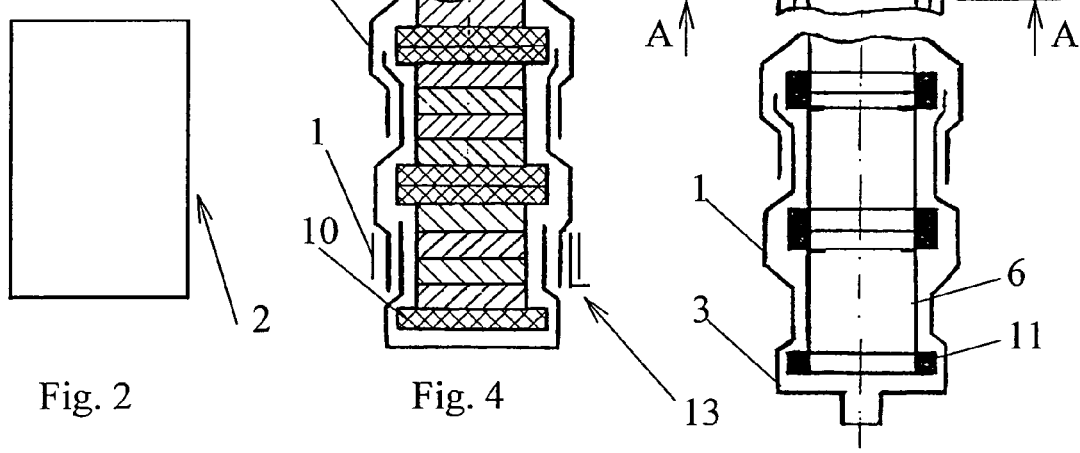
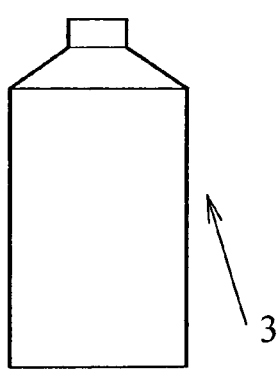
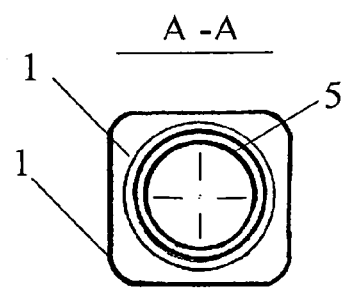
Fig. 1
Fig. 2
Fig. 3
Fig. 4
Fig. 5
Fig. 9

METHOD FOR REUTILISING PLASTIC RECEPTACLES AND ARTICLE PRODUCED BY SAID METHOD

This application is a 371 of PCT/BY02/00001, filed Mar. 14, 2002; the disclosure of which is incorporated herein by reference.

FIELD OF INVENTION

The invention relates to the field of processing polymeric articles, in particular, plastic receptacles, and may be used for reutilising plastic receptacles made of a heat-shrinkable material and for producing articles used mainly as construction and/or advertising elements.

PRIOR ART

The method has been proposed for processing plastic receptacles by grinding, blending, heating, drying and compacting them in a thermal grinder and afterwards feeding the heated mass to the extruder for producing granules or polymeric articles [1].

The disadvantage of this method is high energy intensity and complicated equipment and process.

The object of the invention is to reduce energy intensity of the reutilisation process and expand the range of articles used mainly as construction and/or advertising elements.

DISCLOSURE OF THE INVENTION

This object is accomplished by making hole-type heat-shrinkable elements by cutting plastic receptacles and using the former for coating the surface of structural elements and/or for connecting structural elements together in the process of transforming the structural elements into articles, with hole-type heat-shrinkable elements and structural elements being arranged relative to each other in such a way that hole-type elements are positioned as external elements, while structural elements are positioned as internal elements in the process of coating and/or connecting, and afterwards mounting hole-type heat-shrinkable elements at the place of coating and/or connection by heat shrinking the latter until the contact is reached with the surface being coated and/or with the surface of the structural elements being connected.

Further, according to the invention, hole-type heat-shrinkable elements are made from plastic receptacles by cutting from the latter a neck and/or a bottom part to form hole-type elements in the form of tubes or cylinders comprising a bottom or neck part.

In addition, hole-type elements are made from receptacles being bottles having a cylinder-shaped body.

In addition, according to the invention hole-type heat-shrinkable elements are made from plastic receptacles produced mainly from polyethylene terephthalate by pneumatic molding.

The object may be also accomplished by producing each of the articles by connecting ends of structural elements together by means of hole-type heat-shrinkable elements, with hole-type elements being positioned in such a way that one hole-type heat-shrinkable element overlaps a part of the surface of the adjacent hole-type heat-shrinkable element, or being mounted with a clearance between adjacent hole-type heat-shrinkable elements.

In addition, according to the invention, structural elements are connected together in series to form the article of the preset length or initially a row is formed from hole-type elements and structural elements accommodated therein, and afterwards structural elements are connected actually simultaneously.

In addition, according to the invention, structural elements, located at each end of the row, are connected by means of hole-type heat-shrinkable elements made in the form of cylinders, each comprising the neck or bottom part.

The object is also accomplished by providing at least an outer side surface of each of structural elements with a coating by mounting at least one hole-type heat-shrinkable element before connection.

The object is also to be accomplished by coating the article assembled from structural elements using hole-type heat-shrinkable elements, with said hole-type heat-shrinkable elements being positioned in series and in such a way that one hole-type element overlaps a part of the surface of the adjacent element to form the coating, or by forming initially a row of said hole-type heat-shrinkable elements positioning them so that one element overlaps a part of the surface of the other by a magnitude determined by degree of shrinkage, when hole-type heat-shrinkable elements are heated, and large enough for one said hole-type heat-shrinkable element to overlap a part of the surface of the other element in the shrunk condition.

Further, the object is accomplished by producing each of the articles from cylindrical structural elements having similar end diameter by connecting them together in series end-to-end by means of hole-type heat-shrinkable elements, being cylinders formed by cutting plastic bottles, with hole-type heat-shrinkable elements being positioned in the process of connection in such a way that each following element overlaps a part of the surface of the previous element, by starting and terminating the connection by means of hole-type heat-shrinkable elements having the bottom. Using structural elements having similar end diameters allows quality of the connection to be improved.

The object is also accomplished by using containers in the form of cans comprising at least one collar, provided with the advertising information, for instance, a label, trademark as structural elements.

In addition, the object is accomplished by using blocks as structural elements assembled from flat elements formed by punching from mainly secondary corrugated board.

This method allows for substantially reducing energy costs in reutilising plastic receptacles, facilitating the process and also combining reutilisation thereof with other types of waste.

Further, to accomplish the object, in the article, used mainly as the construction and/or advertising element and comprising hole-type and/or solid mainly cylindrical and/or prismatic structural elements with smoothly mating faces, said structural elements are oriented relative to each other end-to-end and connected together by means of at least one hole-type heat-shrinkable element, with hole-type heat-shrinkable elements, produced by cutting plastic receptacles made of heat-shrinkable material, being used as hole-type heat-shrinkable elements.

In addition, the object is accomplished by connecting structural elements together end-to-end.

Further, to accomplish the object, at least a part of joints comprises joint elements, each having first and second bearing surfaces engaging with ends of adjacent structural elements, with said bearing surfaces being in the planes inclined relative to each other and defining curvature of the article.

The object is also accomplished by making each of the joint elements in the form of a flat element, with the joint element being fit between ends of adjacent structural elements and having the shape corresponding to that of the surface of the structural element ends.

The object is further accomplished by making each of the joint elements in the form of a sleeve receiving ends of adjacent structural elements, with the sleeve having the configuration of the inner surface corresponding to that of the structural element ends and comprising at least one circumferential bead on the outer side surface.

Further, the object is accomplished by using structural elements, each comprising at least one circumferential bead on the outer side surface and/or stiffening members made in the form of flanges on both ends to ensure joint efficiency.

In addition, the object is accomplished by connecting structural elements together by means of hole-type heat-shrinkable elements mounted in such a way that one element overlaps a part of the surface of the other.

The object is also accomplished by connecting structural elements located at both ends of the article by means of hole-type heat-shrinkable elements made in the form of cylinders comprising the neck or bottom part, with ends of said hole-type heat-shrinkable elements being faced outward.

To the accomplishment of the foregoing and related object, the article is provided with a coating formed by means of hole-type heat-shrinkable elements mounted at least in one layer and in such a way that one said hole-type heat-shrinkable element overlaps a part of the surface of the other element.

Further, the object is accomplished by providing the article with connective elements mounted on ends or a side surface, each comprising a base and any conventional fastening member rigidly connected thereto, with the base having the shape corresponding to that of the end or side surface of the article and connected with the article using hole-type heat-shrinkable elements.

Further, the object is accomplished by using containers and/or hole-type members made of containers as structural elements.

The object is also accomplished by using cans having at least one collar and containing the advertising information thereon.

To the accomplishment of the foregoing and related object, the blocks assembled from flat elements punched from corrugated cardboard are used as structural elements.

Putting the claimed invention into practice allows the range of articles used in the construction, advertising and other fields to be substantially expanded.

BRIEF DESCRIPTION OF FIGURES

Substance of the invention can be more fully understood from the following detailed description when taken in conjunction with accompanying drawings, in which FIG. 1 is a hole-type heat-shrinkable element made in the form of a tube, longitudinal section;

FIG. 2 is a hole-type heat-shrinkable element made in the form of a cylinder comprising the bottom part, longitudinal section;

FIG. 3 is a hole-type heat-shrinkable element made in the form of a cylinder comprising the neck part, longitudinal section;

FIG. 4 is an article produced in the form of an elongated element, longitudinal section;

FIG. 5 is an article produced in the form of a curved element from structural elements, longitudinal section;

FIG. 9 is a section taken along axis A-A of FIG. 5;

Figures 6, 7:
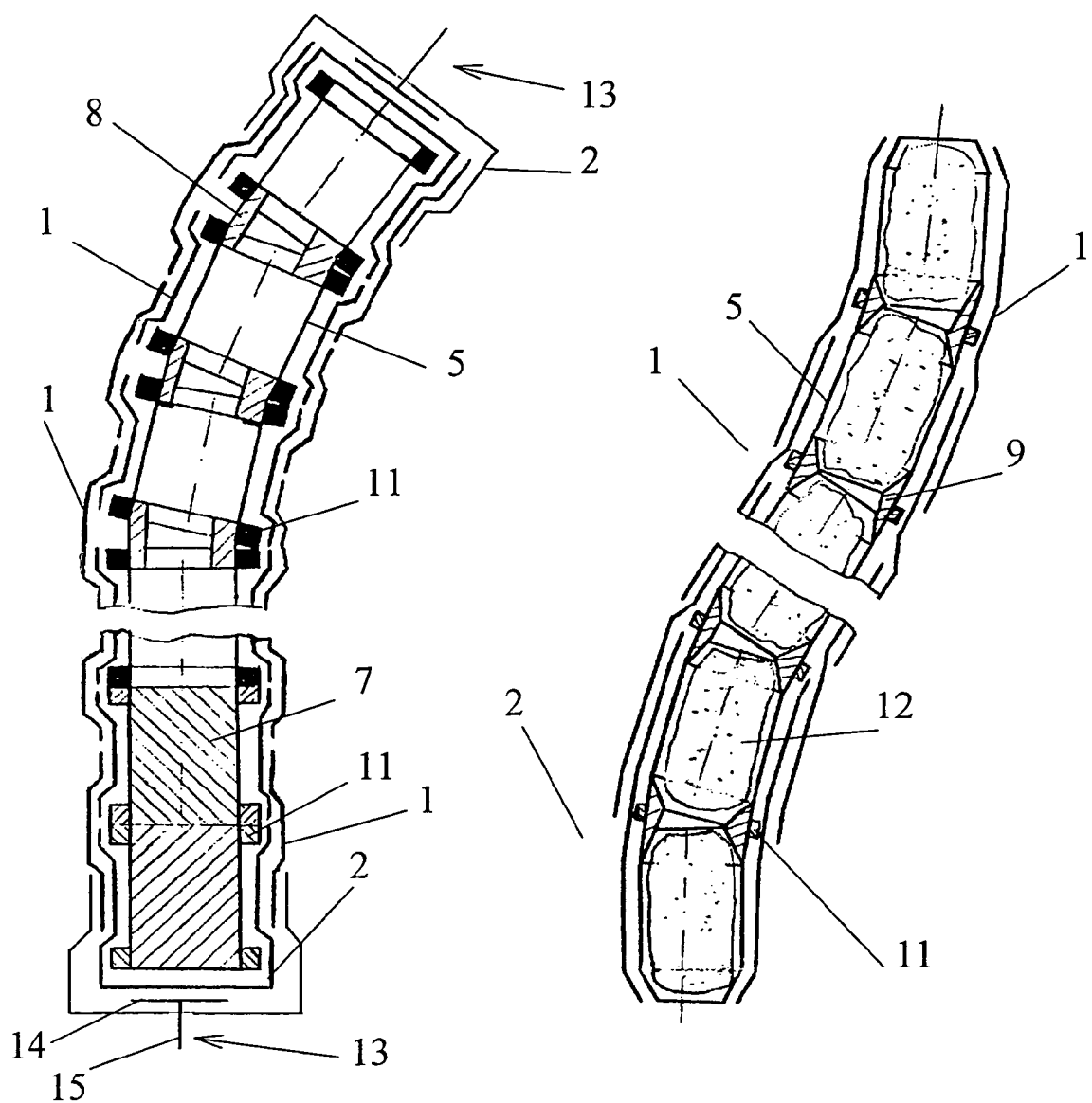
FIG. 6 is an article produced in the form of a curved element from hole-type and solid structural elements, longitudinal section.
FIG. 7 is an article produced in the form of a curved element comprising sleeve-typed joint elements, longitudinal section.

A hole-type element 1 (FIG. 1) is made in the form of a tube from a plastic receptacle by cutting and severing the neck and bottom part therefrom. A hole-type element 2 (FIG. 2) is made in the form of a cylinder comprising the bottom part and is made from the plastic receptacle by cutting and severing the neck part from the latter. A hole-type element 3 (FIG. 3) is made in the form of a cylinder comprising the neck part by cutting the bottom part from the plastic receptacle.

An article (FIG. 4) comprises structural elements 4 in the form of blocks assembled from flat elements punched from corrugated board having flange-type stiffening members 10 on both ends thereof, with the structural elements 4 being connected together by means of hole-type heat-shrinkable elements 1 and hole-type heat-shrinkable elements 2, while hole-type heat-shrinkable elements 1 and 2 are mounted in such a way that one hole-type heat-shrinkable element overlaps a part of the surface of the adjacent element. In addition, the article comprises connective elements 13, each being a base 14 in the form of a plate with a rod-shaped fastening member 15 fixed thereon, with the connective elements 13 being spaced on the side surface of the article at specific intervals and connected with the article by means of the hole-type heat-shrinkable element 1.

An article (FIG. 5) comprises hole-type structural elements 5 of a cylindrical form and hole-type structural elements 6 of prismatic form comprising circumferential beads 11 on the outer side surface thereof, with cans, comprising collars functioning as circumferential beads 11, being used as hole-type structural elements 5 and 6. Flat joint elements 8, the bearing surfaces of which engaging with the ends of structural elements 5 are in the planes inclined relative to each other, are mounted on a part of joints. Hole-type structural elements 5 and/or 6 are connected together by means of hole-type heat-shrinkable elements 1 and also by means of hole type heat-shrinkable elements 2 and 3, with said hole-type heat-shrinkable elements being mounted in such a way that one element overlaps a part of the surface of the adjacent element.

An article (FIG. 6) comprises hole-type structural elements 5 and solid structural elements 7, comprising beads 11 on the outer side surface thereof, with the outer surface of hole-type structural elements 5 and solid structural elements 7 mounted in the article on extreme ends comprising a coating formed by hole-type heat-shrinkable elements 2, while each of the structural elements mounted between extreme structural elements comprises coating of the outer side surface formed by hole-type heat-shrinkable element 1. Flat joint elements 8, the bearing surfaces of which engaging with the ends of structural elements 5 are in the planes inclined relative to each other, are mounted on part of joints. Structural elements 5 and/or 7 are connected together by means of hole-type heat-shrinkable elements 1 mounted with a clearance relative to each other. In addition, both ends of the article mounts connective elements 13, each being a base 14 in the form of a plate with a rod-shaped fastening member 15 fixed thereon, with each of the above connective elements 13 being connected with the end by means of the hole-type heat-shrinkable element 2 made in the form of the cylinder comprising the bottom part in which a hole to receive the rod 15 of the connective element 13 is made.

An article (FIG. 7) comprises hole-type structural elements 5, each having tapered end, with said hole-type structural elements 5 being joined together by means of joint elements 9, each being a sleeve having a shape of the inner surface corresponding to the shape of ends of structural elements 5, with the inner surface of the joint element 9 being made in such a way that it allows the curvilinearity of the article to be formed. The hole-type structural elements 5 are connected together by means of hole-type heat-shrinkable elements 1, in addition, the article is provided with a coating formed by means of hole-type heat-shrinkable elements 1 and 2, with hole-type heat-shrinkable elements 1 and 2 being mounted in such a way that one element overlaps a part of the surface of the adjacent element. In addition, hole-type structural elements 5 are filled with solidifying mainly heat-insulating material 12.

An apparatus for putting the method into practice (FIG. 8., FIG. 10) is a split construction comprising two alignment grooves 16 having clamp-shaped elements 17 mounted on outer surface thereof, with one of the ends of the clamp-shaped elements 17 of the first and second grooves 16 being connected by means of hinges 18 and the other being provided with fixing elements 19, in addition, ends of one of the grooves 16 mount supports 20 provided with screws 21 and made capable of axially acting on ends of structural elements 4.

BEST EMBODIMENT OF THE INVENTION

Used plastic receptacles are sorted into groups accounting size, shape and color.

The receptacles are sorted to determine what receptacle may be used for producing a specific article.

After sorting the receptacles, they are cut to produce hole-type heat-shrinkable elements 1 made in the form of tubes, hole-type shrinkable elements 2 made in the form of cylinders having a bottom part and hole-type heat-shrinkable elements 3 made in the form of cylinders having a neck part. Further, said hole-type heat-shrinkable elements 1, 2, 3 are used to coat and/or connect structural elements in the process of co-transformation into the article.

Embodiment 1

An article (FIG. 6) is produced by sequentially connecting solid structural elements 7 and hole-type structural elements 5. First two solid structural elements 7 are fitted into the hole-type heat-shrinkable element 1 aligning and butting together ends of solid structural elements 7 and fixing them in this position using any conventional method, afterwards the hole-type heat-shrinkable element 1 is heated until it contacts the surface of solid structural elements 7. In the shrunk condition, the hole-type heat-shrinkable element 1 tightly encloses circumferential beads, thereby providing joint efficiency. A high-temperature electric dryer, for instance, is used for heating. The next hole-type structural element is joined to connected solid structural elements 7 by means of hole-type heat-shrinkable element 1. For this purpose, the hole-type heat-shrinkable element 1 is slipped over the connected solid structural elements 7 and then a free end of the solid structural element 7 is aligned and butted with the end of the hole-type structural element 5 and is fixed in this position, afterwards the hole-type heat-shrinkable element 1 is moved over the joint zone and heated until it contacts the surface of the solid structural element 7 and hole-type structural element 5, while hole-type heat-shrinkable elements 1 are mounted with a clearance relative to each other. To form a curvilinear section of the article, flat joint elements 8 are used, for this purpose the hole-type shrinkable element 1 is slipped over the connected solid structural elements 7 and hole-type structural element 5, afterwards the flat joint element 8 is fitted between ends of hole-type structural elements 5 to butt with ends of the hole-type structural elements 5 and fix in this position, afterwards the hole-type heat-shrinkable element is slipped over the joint zone and heated until it contacts the surface of hole-type structural elements 5.

Embodiment 2

An article (FIG. 6) is produced is a similar manner, as disclosed herein above in the Embodiment 1, except that the article is produced from solid structural elements 7 and hole-type structural elements 5, with outer surface of each element being coated before connecting them. For this purpose, hole-type heat-shrinkable elements 2 are slipped over each of structural elements 7 and 5 mounted in the article on extreme ends, and then ends of structural elements 7 and 5 are butted with the inner surface of the bottom of hole-type shrinkable elements 2 and fixed in this position, while hole-type heat-shrinkable elements are slipped over the remaining elements and then placed horizontally, for example, on a grating and are simultaneously heated, for instance, in a thermal cabinet, shrinking hole-type heat-shrinkable elements 1 and 2 until they contact the surface of structural elements 7 and 5.

Embodiment 3

An article (FIG. 5) is produced is a similar manner, as disclosed herein above in the Embodiment 1, except that the first two hole-type structural elements 6 are fitted into the hole-type heat-shrinkable element 3 and then the end of the structural element 6 is joined with the inner surface of the hole-type heat-shrinkable element 3, afterwards they are fixed in this position and heated until they contact with the surface of hole-type structural elements 6, further the hole-type heat-shrinkable element 1 is slipped over the connected structural elements 6, then a free end of the hole-type structural element 6 is butted with the end of the hole-type structural element 5 and fixed in this position, then the hole-type heat-shrinkable element 1 is slipped over the joint zone and is positioned in such a way that the hole-type heat-shrinkable element 1 overlaps a part of the surface of the previous hole-type heat-shrinkable element 3 in the shrunk condition, then it is heated and shrinks until it contacts the surface of hole-type structural elements 5 and 6 and also the surface of the hole-type heat-shrinkable element 3. To connect the hole-type structural element 5 located on the article end, said element 5 is fitted into the hole-type heat-shrinkable element 2 and then the flat joint element 8 is inserted, then the element 2 is slipped over the connected hole-type structural element 5, and further the hole-type heat-shrinkable element 2 is butted, fixed and shrunk until it contacts the surface of the previous hole-type heat-shrinkable element 1.

Embodiment 4

An article (FIG. 7) is produced in a similar manner, as disclosed herein above in the Embodiments 1-3, except that adjacent hole-type structural elements 5 are butted together by means of joint elements 9 and also that the article assembled from the structural elements is provided additionally with a coating by means of hole-type heat-shrinkable elements mounted on the coating zone in a manner similar to that in the process of connection.

Figure 8:
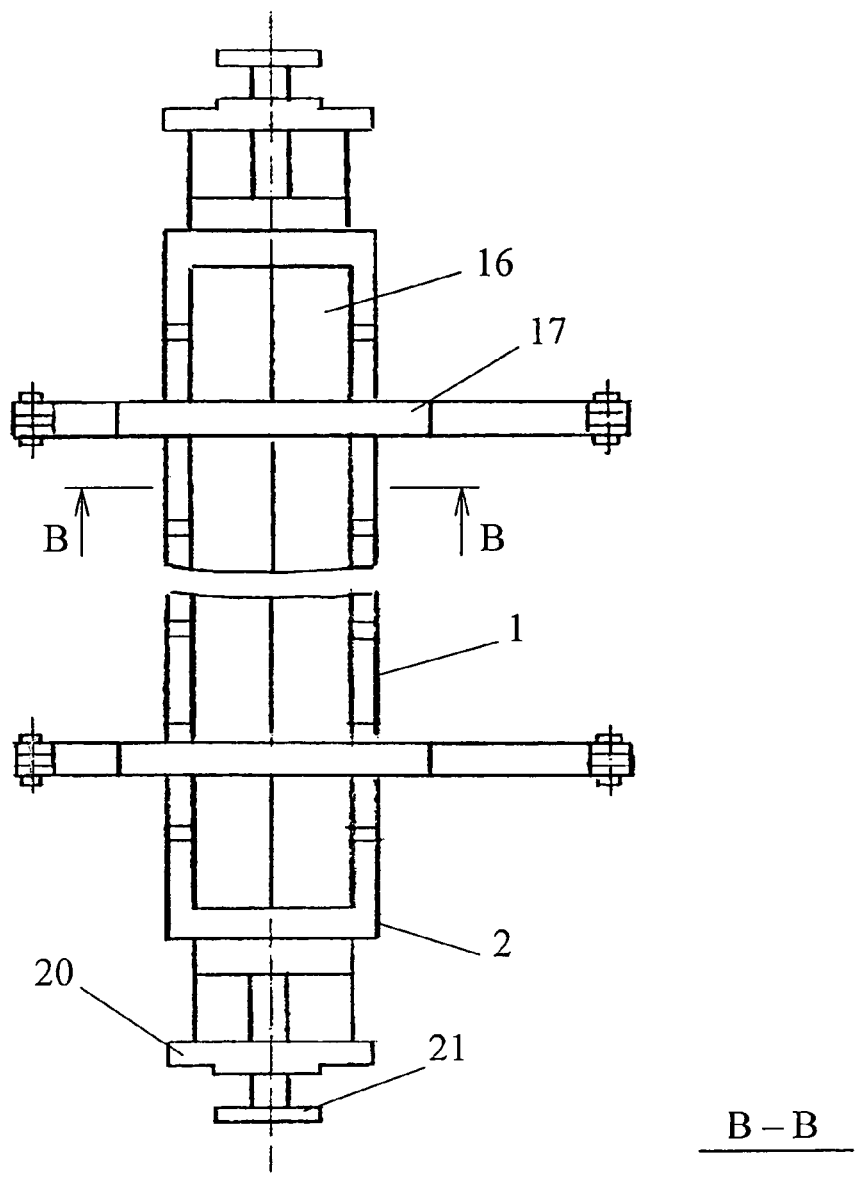
FIG. 8 is an apparatus for producing articles, plan view.
Figure 10:
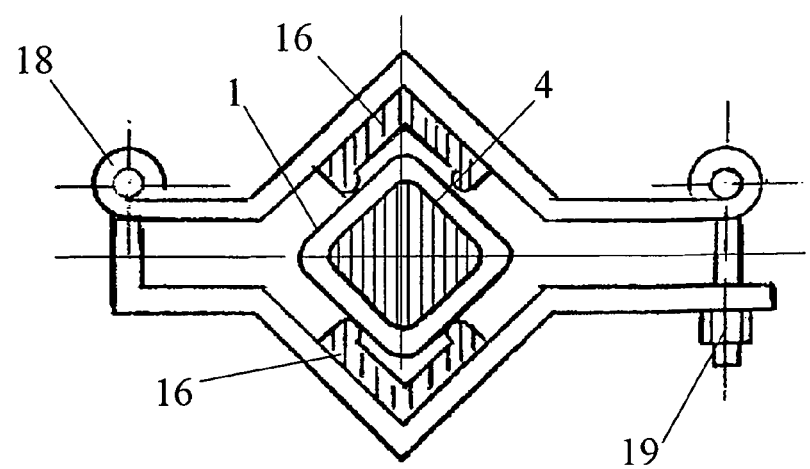
FIG. 10 is a section taken along axis B-B of FIG. 8.

An article (FIG. 4) is produced by using the apparatus illustrated in FIG. 8, FIG. 10. Hole-type heat-shrinkable elements 1 are placed in one of the alignment grooves 16 inserting them into adjacent ones, structural elements 4 are inserted into said hole-type heat-shrinkable elements 1 butting the former end-to-end to form a row of specific length, then hole-type elements 2 are slipped over the extreme-end structural elements 4, afterwards the second alignment groove 16 hinged with the first groove 16 is mounted on the formed row, after that the groove is fixed in this position with fixing elements 19 and then the row is axially tightened up with screws 21, hole-type heat-shrinkable elements 1 and 2 are heated in the thermal cabinet until they contact with the surface of structural elements 4.

In each specific case, shrinkage temperature is selected depending on the material from which used receptacles are made, wall thickness of receptacles being reutilised, their size and desired shrinkage rate.

Structural elements made by pressing or molding ground wood, pulp and construction blends are mainly used as structural elements for producing articles. Rigid containers, for instance, cans, aerosol dispensers, bottles, square bottles made of metal, glass, ceramics and polymeric materials are also mainly used as structural elements for producing articles. To improve strength and heat-insulating properties of the articles to be produced, containers used as structural elements, for instance beer cans or coffee cans, are prefilled with a solidifying material, for example, foamed polyurethane.

It should be noted that to produce articles, hole-type heat-shrinkable elements may be assembled into honeycomb-type prefabricated elements by connecting side surfaces of said hole-type elements together by means of, for example, rivets, and then articles disclosed in the embodiments may be assembled into blocks and panels using said prefabricated elements.

To manufacture hole-type heat-shrinkable elements, PET bottles and also PET jars are mainly used. To manufacture advertising elements, PET receptacles made of a transparent material are used.

It should be noted that to produce articles, other hole-type heat-shrinkable articles may be also used for producing articles in addition to hole-type heat-shrinkable elements made of PET receptacles. For example, elongated hole-type heat-shrinkable elements, made from specially fabricated elongated PET receptacles, may be used.

It is not intended that the invention be limited to the disclosed embodiments, with the latter being only illustrations of the former. In practice this invention may be variously otherwise embodied without altering the major idea of the invention and spirit of the invention.

INDUSTRIAL APPLICATION

Putting the claimed invention into practice allows for efficiently reutilising plastic receptacles due to the fact that expensive equipment and special knowledge are not required for reutilising process that may be conducted directly at the waste disposal sites, while conventional equipment may be used for implementing the method. In addition, the provided method is ecology-friendly. The articles produced by realizing the method being claimed will allow for substantially expanding the range of articles used mainly as construction and/or advertising elements. Wall and roofing panels, blocks and other structures made from said elements possess high service performance, namely, durability, sound-proofing/heat-insulating properties, resistance to weather impacts and ease of mounting.

REFERENCES

1. Tara i Upakovka Journal. Moscow. 2000/2, p. 24

What is claimed is:

1. A method for reutilising plastic receptacles made of a material possessing heat-shrinkage properties, wherein hollow heat-shrinkable elements are made by cutting plastic receptacles and used for coating the surface of structural elements and/or for connecting structural elements together while transforming the structural elements into articles, wherein said hollow heat-shrinkable elements and structural elements being arranged relative to each other in such a way that said hollow elements are positioned as external elements, while structural elements are positioned as internal elements while coating and/or connecting, and further hollow heat-shrinkable elements are mounted at the place of coating and/or connection by heat shrinking said hollow heat-shrinkable elements until contact is reached with a surface being coated and/or with the surface of the structural elements being connected.

2. A method for reutilising as in claim 1, wherein said hollow heat-shrinkable elements are made from plastic receptacles by cutting a neck and/or bottom part from said receptacles to form hollow elements in the form of tubes or cylinders comprising the bottom or neck part.

3. A method for reutilising as in claim 1, wherein said hollow elements are made from receptacles being bottles having a cylindrical form.

4. A method for reutilising as in claim 1, wherein said hollow heat-shrinkable elements are made from plastic receptacles fabricated mainly of polyethylene terephthalate by pneumatic molding.

5. A method for reutilising as in claim 1, wherein each of the articles is produced from cylindrical structural elements having similar end diameter by connecting them together in series end-to-end by means of hollow heat-shrinkable elements, being cylinders formed by cutting plastic bottles, with hollow heat-shrinkable elements being positioned in the process of connection in such a way that each following element overlaps a pan of the surface of the previous element, while the connection is started and terminated by means of hollow heat-shrinkable elements having the bottom.

6. A method for reutilising as in claim 1, wherein containers in the form of cans comprising at least one collar and provided mainly with the advertising information are used as structural elements.

7. A method for reutilising in claim 1, wherein blocks assembled from flat elements formed by punching from mainly secondary corrugated board are used as structural elements.

8. A method for reutilising as in claim 1, wherein each of the articles is produced by connecting structural elements together end-to-end by means of hollow heat-shrinkable elements, with the hollow elements being mounted in such a way that one hollow heat-shrinkable element overlaps a part of the surface of the adjacent hollow heat-shrinkable element or being mounted with a clearance between adjacent hollow heat-shrinkable elements.

9. A method for reutilising as in claim 8, wherein structural elements are connected together in series to form an article of a specific length, or initially a row is formed from hollow elements and structural elements accommodated therein, and afterwards structural elements are connected actually simultaneously.

10. A method for reutilising as in claim 8, wherein structural elements, located at each end of the row, are connected by means of hollow heat-shrinkable elements made in the form of cylinders, each comprising the neck or bottom part.

11. A method for reutilising as in claim 8, wherein at least an outer side surface of each of structural elements is provided with a coating by mounting at least one hollow heat-shrinkable element before connection.

12. A method for reutilising in claim 8, wherein an article assembled from structural elements is coated using hollow heat-shrinkable elements, with said hollow heat-shrinkable elements being positioned in series and in such a way that one hollow element overlaps a part of the surface of the adjacent element to form the coating, or initially a row of said hollow heat-shrinkable elements is formed positioning them so that one element overlaps a part of the surface of the other by a magnitude determined by degree of shrinkage, when hollow heat-shrinkable elements are heated, and large enough for one said hollow heat-shrinkable element to overlap a part of the surface of the other element in the shrunk condition.

* * * * *